N. H. WHITTEN.
Operating Paper-Calendering Rolls.

No. 162,260.  Patented April 20, 1875.

Witnesses:
L. H. Latimer
Wm Pratt

Inventor:
Nathan H. Whitten
PER Crosby Gregory Atty's.

UNITED STATES PATENT OFFICE.

NATHAN H. WHITTEN, OF HOLYOKE, MASSACHUSETTS, ASSIGNOR TO HOLYOKE MACHINE COMPANY, OF SAME PLACE.

IMPROVEMENT IN OPERATING PAPER-CALENDERING ROLLS.

Specification forming part of Letters Patent No. 162,269, dated April 20, 1875; application filed March 17, 1875.

*To all whom it may concern:*

Be it known that I, NATHAN H. WHITTEN, of Holyoke, in the county of Hampden and State of Massachusetts, have invented an Improvement in Operating Paper-Calendering Rolls, of which the following is a specification:

In machines for calendering paper it is necessary to operate them at quick and at slow rates of speed—the latter when introducing the end of a new web of paper and connecting it with the take-up reel, and the former when the paper has been so introduced and connected, until the roll of paper operated upon is about exhausted, and preparation is made to introduce the end of a new web.

In practice, this is usually effected as follows: When the machine is running at high speed the high-speed driver is disconnected and the machine is stopped, while a toothed gear and a toothed pinion are meshed; then the machine is started at its slow rate of speed by putting in motion the means for rotating the toothed pinion. This involves loss of time, and power is lost by inertia of the parts in making the changes of motion. The stoppage is necessary, as without it the teeth of the gears would be stripped in meshing them. In the change from the slow to the quick motion the gears can be unmeshed without stopping the machine, and the quick motion can be brought into action. Even in starting the machine from a state of rest it requires caution to avoid breakage of the teeth of the gears, so great is the inertia of the parts and the resistance to be overcome.

The object of my invention is to effect, without stoppping the machine, the change in the speed of the calendering-rolls from quick to slow, and from slow to quick, easily, with certainty, and without loss of time, and with the least possible loss of power, and without risk of breakage of any of the parts; and my invention consists in the means which I employ to obtain quick and slow motion of the calendering-rolls without the use of toothed gearing.

Figure 1:
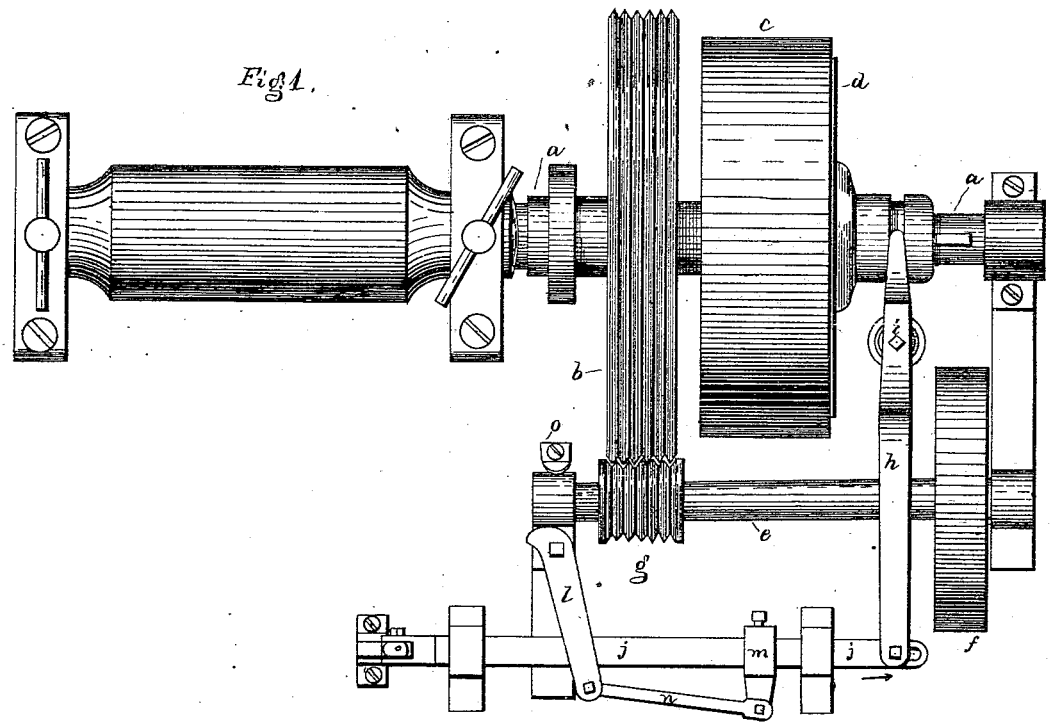
Figure 2:
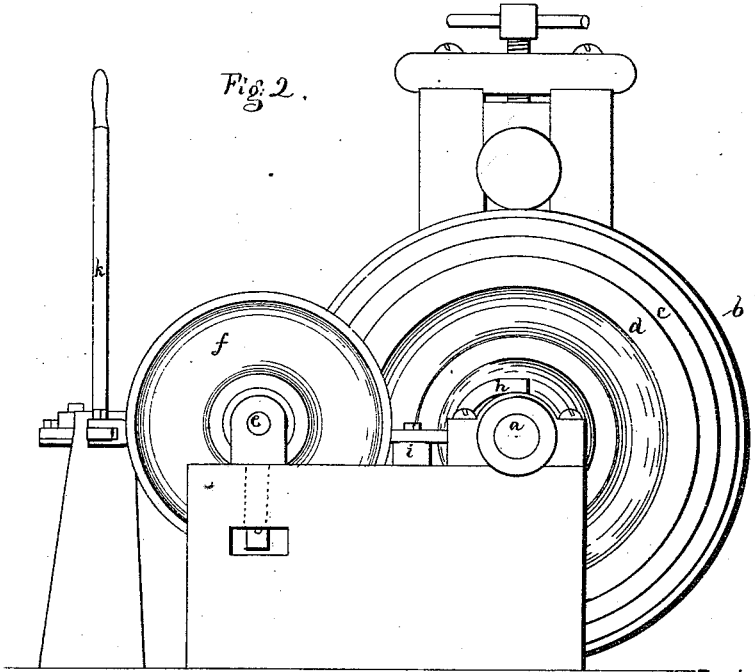

Figure 1 shows in plan, and Fig. 2 in end view, a calendering-machine in which my invention is embodied.

As there is nothing novel about the construction and arrangement of the calendering-rolls, no description thereof will be needed.

The lower roll is driven from the shaft $a$, on which is fixed the grooved frictional gear-wheel $b$. The belt-driven pulley $c$ is fitted so as to revolve freely on shaft $a$, and the friction-cone $d$ is arranged with a spline, so that it can be moved in the direction of the length of the shaft, into and out of contact with a correspondingly conical surface on the pulley $c$, the parts $c$ and $d$ constituting a well-known form of friction-pulley, for which other known forms of friction or clutch pulleys may be substituted. Parallel with shaft $a$ is shaft $e$, made capable of motion toward and from shaft $a$, and on $e$ are fixed a belt-driven pulley, $f$, and a grooved friction-pinion, $g$. The hub of the sliding friction-cone $d$ is grooved to receive pins or rolls in the forked end of lever $h$, fulcrumed at $i$, the end of the long arm of $h$ having a pin, which enters a slot in the end of slide $j$, which slide is so arranged that it can be reciprocated by motion given to the hand-lever $k$. Lever $l$ is pivoted near one end, which is inclined or cam-shaped, and in contact with the movable bearing of shaft $e$ nearest pinion $g$. This lever $l$ is connected to slide $j$ by an adjustable piece, $m$, through link $n$, so that in reciprocations of slide $j$ the cam-shaped short arm of lever $l$ will act against the movable bearing of shaft $e$, and in connection with a spring, also acting on said bearing, will cause contact between the grooved friction-gear $b$ and pinion $g$, or will release the pinion $g$ from contact, as may be desired. Movement of slide $j$ in the direction of the arrow retracts the cam-shaped end of $l$, and allows the spring $o$ to move the pinion $g$ out of contact with wheel $b$. At the same time, after the slot in slide $j$ traverses the pin in the end of the long arm of lever $h$, said lever is caused, by further movement of slide $j$ in the same direction, to force the cone $d$ into its conical seat in the pulley $c$. Reverse movement of slide $j$, after said slot has traversed said pin, retracts the cone $d$ from the pulley $c$, and causes the cam on lever $l$ to force the friction-pinion $g$ into contact with the friction-gear $b$. The end of shaft $e$ nearest the belt-pulley $f$ is carried in a pivoted bearing, which allows of the necessary movement of the other end of the shaft.

The operation is as follows: Suppose both pulleys $c$ and $f$ belted and moving with the desired velocity, and the parts in such position that the pin in the long arm of lever $h$ is midway between the ends of the slot in $j$; then the pinion $g$ is free from contact with wheel $b$, and the cone $d$ from the pulley $c$. To start the machine into its quick movement, move the slide $j$ in the direction of the arrow, which makes contact between the parts $c$ and $d$ of the friction-pulley, and drives the calender-rolls. Then reverse the motion of slide $j$, and the parts $c$ and $d$ are released from contact, the part $c$ revolving idly, and the pinion $g$ being forced into contact with wheel $b$, the speed is reduced at once. The machine may be stopped, when desired, by so placing slide $j$ that the pin in the end of the long arm of lever $h$ is midway between the ends of the slot in the slide, and both belt-pulleys will then rotate idly.

The detail of the parts which I have described for alternately bringing into action both the fast and slow mechanisms, and for throwing both out of action, operates well in practice; but it is evident that other equivalent devices may be employed for the same purpose without departure from my invention.

I do not claim, broadly, friction-gearing, nor do I claim a friction-gear on a movable rotating shaft, when arranged to engage a second friction-gear or a second shaft; but What I do claim is—

1. In a calendering-machine, the combination, with the shaft driving the calendering-rolls, its friction belt-pulley or friction-clutch and friction-wheel, of a friction-pinion on an independently-rotated shaft, the friction belt-pulley or clutch and friction wheel and pinion being adapted to alternately operate the calendering-rolls at different speeds, substantially as set forth.

2. The combination, with shaft $a$ of the calendering-machine, its friction belt-pulley or clutch, and friction-wheel, of the independently-rotated shaft, its friction-pinion, and mechanism, substantially as described, to operate for engaging and disengaging the parts, substantially as and for the purpose set forth.

In testimony whereof I have signed my name to this specification in the presence of two subscribing witnesses.

NATHAN H. WHITTEN.

Witnesses:
  STEPHEN HELMAN,
  S. F. STEBBINS.